(12) United States Patent
Hori et al.

(10) Patent No.: US 8,867,688 B2
(45) Date of Patent: Oct. 21, 2014

(54) NOZZLE MOUNTING STRUCTURE

(75) Inventors: Nobuyuki Hori, Tokyo (JP); Ryuichi Narita, Tokyo (JP); Moritatsu Nishimura, Tokyo (JP); Harutaka Suzuki, Tokyo (JP); Koji Okimura, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 702 days.

(21) Appl. No.: 13/008,429

(22) Filed: Jan. 18, 2011

(65) Prior Publication Data
US 2011/0194663 A1 Aug. 11, 2011

(30) Foreign Application Priority Data
Jan. 18, 2010 (JP) ................................. 2010-008587

(51) Int. Cl.
*G21C 1/00* (2006.01)
*G21C 17/017* (2006.01)
*G21C 13/036* (2006.01)
*F16L 5/02* (2006.01)

(52) U.S. Cl.
CPC ............... *G21C 13/036* (2013.01); *Y02E 30/40* (2013.01); *G21C 17/017* (2013.01); *F16L 5/022* (2013.01)
USPC ....................................................... 376/204

(58) Field of Classification Search
USPC ................................................ 376/202–203
See application file for complete search history.

(56) References Cited

U.S. PATENT DOCUMENTS

| 4,114,654 | A |   | 9/1978  | Richardson |
| 4,322,598 | A |   | 3/1982  | Blair |
| 5,271,048 | A | * | 12/1993 | Behnke et al. ................ 376/260 |
| 5,404,382 | A | * | 4/1995  | Russ et al. ..................... 376/260 |
| 5,544,209 | A |   | 8/1996  | Michaut et al. |
| 5,605,361 | A | * | 2/1997  | Sims ............................. 285/206 |

(Continued)

FOREIGN PATENT DOCUMENTS

| JP | 60-008789 A | 1/1985 |
| JP | 01-196596 A | 8/1989 |

(Continued)

OTHER PUBLICATIONS

W/ English Translation. Korean Office Action dated Apr. 16, 2012, issued in corresponding Korean Patent Application No. 10-2011-0004438, (9 pages).

(Continued)

*Primary Examiner* — Timothy A Brainard
(74) *Attorney, Agent, or Firm* — Westerman, Hattori, Daniels & Adrian, LLP

(57) ABSTRACT

[Problem] To facilitate mounting of a nozzle.
[Solving Means] In a nozzle mounting structure for mounting a nozzle 20 penetrating through a reactor vessel 10 having a hemispherical concave inner surface, the nozzle mounting structure includes a removed concave portion 17 in which a base material 12 on an inner surface side of the reactor vessel 10 is removed in a symmetrical shape around a normal line N on the hemispherical concave inner surface of the reactor vessel 10, a flange 25 provided on the nozzle 20, formed in a same symmetrical shape as that of the removed concave portion 17 around the normal line N, and inserted into the removed concave portion 17, and a weld part 18 provided around the normal line N for welding the flange 25 to the reactor vessel 10.

3 Claims, 13 Drawing Sheets

(56) References Cited

U.S. PATENT DOCUMENTS

| | | | |
|---|---|---|---|
| 5,661,767 A * | 8/1997 | Roux | 376/260 |
| 5,675,618 A | 10/1997 | Amburn et al. | |
| 5,809,098 A | 9/1998 | Deaver | |
| 5,918,911 A | 7/1999 | Sims | |
| 2005/0199591 A1* | 9/2005 | Coe et al. | 219/76.1 |
| 2005/0205527 A1 | 9/2005 | Remond et al. | |

FOREIGN PATENT DOCUMENTS

| | | |
|---|---|---|
| JP | 02-102492 A | 4/1990 |
| JP | 02-102493 A | 4/1990 |
| JP | 02-102494 A | 4/1990 |
| JP | 02-210296 A | 8/1990 |
| JP | 06-230167 A | 8/1994 |
| JP | 6-87896 U | 12/1994 |
| JP | 6-87897 U | 12/1994 |
| JP | 7-218678 A | 8/1995 |
| JP | 2530010 B2 | 9/1996 |
| JP | 2530011 B2 | 9/1996 |
| JP | 09-203788 A | 8/1997 |
| JP | 10-039074 A | 2/1998 |
| JP | 2005-219124 A | 8/2005 |
| JP | 2007-232457 A | 9/2007 |
| JP | 2007-333741 A | 12/2007 |
| JP | 2011-075453 A | 4/2011 |
| KR | 1983-0002648 B1 | 12/1983 |
| KR | 10-2006-0041775 A | 5/2006 |

OTHER PUBLICATIONS

Extended European Search Report dated Apr. 18, 2013, issued in corresponding European Patent Application No. 12195191.7, (6 pages).

Extended European Search Report dated Apr. 3, 2012, issued in corresponding European Patent Application No. 11151265.3, (7 pages).

Notice of Allowance dated Dec. 14, 2012, issued in corresponding Korean Patent Application No. 10-2011-0004438, with Partial Translation (3 pages).

Japanese Notification of Reason for Refusal dated Jan. 28, 2014, issued in corresponding Japanese application No. 2010-008587, w/ English translation (5 pages).

Japanese Office Action dated Jul. 15, 2014, issued in corresponding Japanese Patent Application No. 2010-008587 with English translation (5 pages).

* cited by examiner

NOZZLE MOUNTING STRUCTURE

TECHNICAL FIELD

The present invention relates to a nozzle mounting structure for mounting a nozzle on a reactor vessel.

Background Art

A reactor vessel has a nozzle mounted thereon. The nozzle is made of stainless steel or Ni-base alloy. Stress corrosion cracking can be caused in the nozzle by an action of a tensile stress in a corrosive environment in which high-temperature and high-pressure water of a reactor cooling material is present. Therefore, it is possible that the nozzle and a weld part for fixing the nozzle to the reactor vessel are damaged. Accordingly, repair is performed according to need and the nozzle is replaced.

Conventionally, for example, Patent Literature 1 describes a method of replacing a nozzle fixed and supported by welding with respect to a weld part on a reactor vessel lower head. According to this method, after the nozzle fixed and supported in the weld part on the reactor vessel lower head is respectively cut above and below the weld part to remove an upper nozzle and a lower nozzle, a welded part of the reactor vessel is removed together with the remaining nozzle, and the removed portion is overlay welded and restored. The lower nozzle is then inserted from a through-hole of the reactor vessel and fixed to the reactor vessel by welding, and an insertion end of the lower nozzle is fixed to the upper nozzle by welding.

CITATION LIST

Patent Literature

[PTL 1] JP 2530011A

SUMMARY OF INVENTION

Technical Problem

An inner surface of a reactor vessel lower head has a hemispherical concave shape, and an existing weld part has a complicated three-dimensional shape. Therefore, when the weld part is to be restored, buttered welding is required to the complicated three-dimensional shape. Further, because the inside of the reactor vessel is in an underwater environment or an atmospheric environment with high radiation dose, it is desired to avoid a manual operation and perform a welding operation by a remote automatic device. However, buttered welding to a complicated shape by using the remote automatic device is difficult, and thus mounting of the nozzle is not easy.

The present invention has been achieved to solve the above problems, and an object of the present invention is to provide a nozzle mounting structure capable of facilitating mounting of a nozzle.

Solution to Problem

According to an aspect of the present invention, a nozzle mounting structure for mounting a nozzle penetrating through a reactor vessel having a hemispherical concave inner surface, includes: a removed concave portion in which a base material on an inner surface side of the reactor vessel is removed in a symmetrical shape around a normal line on a hemispherical concave inner surface of the reactor vessel; a flange provided on the nozzle, formed in a same symmetrical shape as that of the removed concave portion around the normal line, and inserted into the removed concave portion; and a weld part provided around the normal line for welding the flange to the reactor vessel.

According to the nozzle mounting structure, slotting of the removed concave portion, positioning of the nozzle in the flange, and welding of the flange with respect to the reactor vessel can be performed around the normal line on the hemispherical concave inner surface of the reactor vessel. Accordingly, mounting of the nozzle can be easily performed.

Advantageously, in the nozzle mounting structure, the nozzle is divided into an outer nozzle including the flange and extending to outside of the reactor vessel, and an inner nozzle arranged inside of the reactor vessel, which does not include the flange, and the outer nozzle and the inner nozzle are connected to each other.

According to the nozzle mounting structure, when the weld part is provided, if the inner nozzle is divided from the outer nozzle, the inner nozzle is not present in a trajectory for performing welding in a symmetrical shape around the normal line, thereby facilitating operations. Further, a forest of nozzles is present on the inner side of the reactor vessel, and there is only a narrow space between adjacent nozzles. A wide work space can be ensured by dividing the inner nozzle from the outer nozzle, thereby facilitating operations. Accordingly, mounting of the nozzle can be performed more easily.

According to another aspect of the present invention, a nozzle mounting structure for mounting a nozzle penetrating through a reactor vessel having a hemispherical concave inner surface, includes: a removed concave portion in which a base material on an inner surface side of the reactor vessel is removed based on a symmetrical shape around a centerline of the nozzle; a flange provided on the nozzle, formed in a symmetrical shape around the centerline, inserted into the removed concave portion, and protruding to outside of the removed concave portion; an overlay weld part welded to a surface of a clad provided on an inner surface of the reactor vessel and over an outer circumference of the flange protruding to outside of the removed concave portion around the centerline; and a joint weld part for welding the flange to the overlay weld part around the centerline.

According to the nozzle mounting structure, grooving of the removed concave portion, positioning of the nozzle in the flange, and welding of the flange with respect to the reactor vessel can be performed around the centerline of the nozzle. Accordingly, mounting of the nozzle can be easily performed. Further, because the overlay weld part is welded to the surface of the clad and over the outer circumference of the flange protruding outward of the removed concave portion, and does not come in contact with the base material of the removed concave portion, any heating operation is not required. Therefore, operation processes can be reduced, and thus mounting of the nozzle can be further facilitated.

According to still another aspect of the present invention, a nozzle mounting structure for mounting a nozzle penetrating through a reactor vessel having a hemispherical concave inner surface, includes: a removed concave portion in which a base material on an inner surface side of the reactor vessel is removed based on a symmetrical shape around a centerline of the nozzle; and a weld part provided around the centerline for welding the nozzle inserted into the removed concave portion to the reactor vessel.

According to the nozzle mounting structure, grooving of the removed concave portion, positioning of the nozzle, and welding of the nozzle with respect to the reactor vessel can be performed around the centerline of the nozzle. Therefore, mounting of the nozzle can be easily performed.

Advantageously, in the nozzle mounting structure, the nozzle is divided into an outer nozzle including a welded portion by the joint weld part and extending to outside of the reactor vessel, and an inner nozzle arranged inside of the reactor vessel, which does not include the welded portion by the joint weld part, and the outer nozzle and the inner nozzle are connected to each other.

According to the nozzle mounting structure, when the joint weld part is provided, if the inner nozzle is divided from the outer nozzle, the inner nozzle is not present on the centerline, thereby facilitating a joint welding operation. Further, a forest of nozzles is present on the inner side of the reactor vessel, and there is only a little space between adjacent nozzles. A wide work space can be ensured by dividing the inner nozzle from the outer nozzle, thereby facilitating operations. Accordingly, mounting of the nozzle can be performed more easily.

According to still another aspect of the present invention, a nozzle mounting structure for mounting a nozzle penetrating through a reactor vessel having a hemispherical concave inner surface, includes: a removed concave portion in which a base material on an inner surface side of the reactor vessel is removed based on a symmetrical shape around a centerline of the nozzle; a flange provided on the nozzle, formed in a symmetrical shape around the centerline, and inserted into the removed concave portion; a sealing part that seals between a clad provided on an inner surface of the reactor vessel and the flange around the centerline; and a fixing part that fixes the nozzle in a through-hole of the reactor vessel.

According to the nozzle mounting structure, grooving of the removed concave portion, positioning of the nozzle in the flange, and seal-up and fixation of the flange with respect to the reactor vessel can be performed around the centerline of the nozzle. Accordingly, mounting of the nozzle can be easily performed. Further, because buttered welding is not performed due to having the sealing part and the fixing part, any buttered welding operation and heating operation are not required, thereby enabling to reduce operation processes and to facilitate mounting of the nozzle.

Particularly, according to the nozzle mounting structure, because joint welding, buttered welding, and heat treatment are not required, construction can be performed in an underwater environment, and any operation of creating an atmospheric environment is not required. Accordingly, operation processes can be considerably reduced, and thus mounting of the nozzle can be further facilitated.

Advantageously, in the nozzle mounting structure, the fixing part is formed by threading between an outer surface of the nozzle and an inner surface of the through-hole.

According to the nozzle mounting structure, an operation of mounting a nozzle can be easily performed.

Advantageously, in the nozzle mounting structure, the fixing part is formed by close attachment between an outer surface of the nozzle being expanded and an inner surface of the through-hole.

According to the nozzle mounting structure, an operation of mounting a nozzle can be easily performed.

Advantageously, in the nozzle mounting structure, the sealing part is formed by seal welding.

According to the nozzle mounting structure, a gap between the clad and the flange can be reliably sealed.

Advantageous Effects of Invention

According to the present invention, mounting of a nozzle can be easily performed.

DESCRIPTION OF EMBODIMENTS

Exemplary embodiments of the present invention will be explained below in detail with reference to the accompanying drawings. The present invention is not limited to the embodiments. In addition, constituent elements in the following embodiments include those that can be replaced by persons skilled in the art or that are substantially equivalent.

Figure 1:
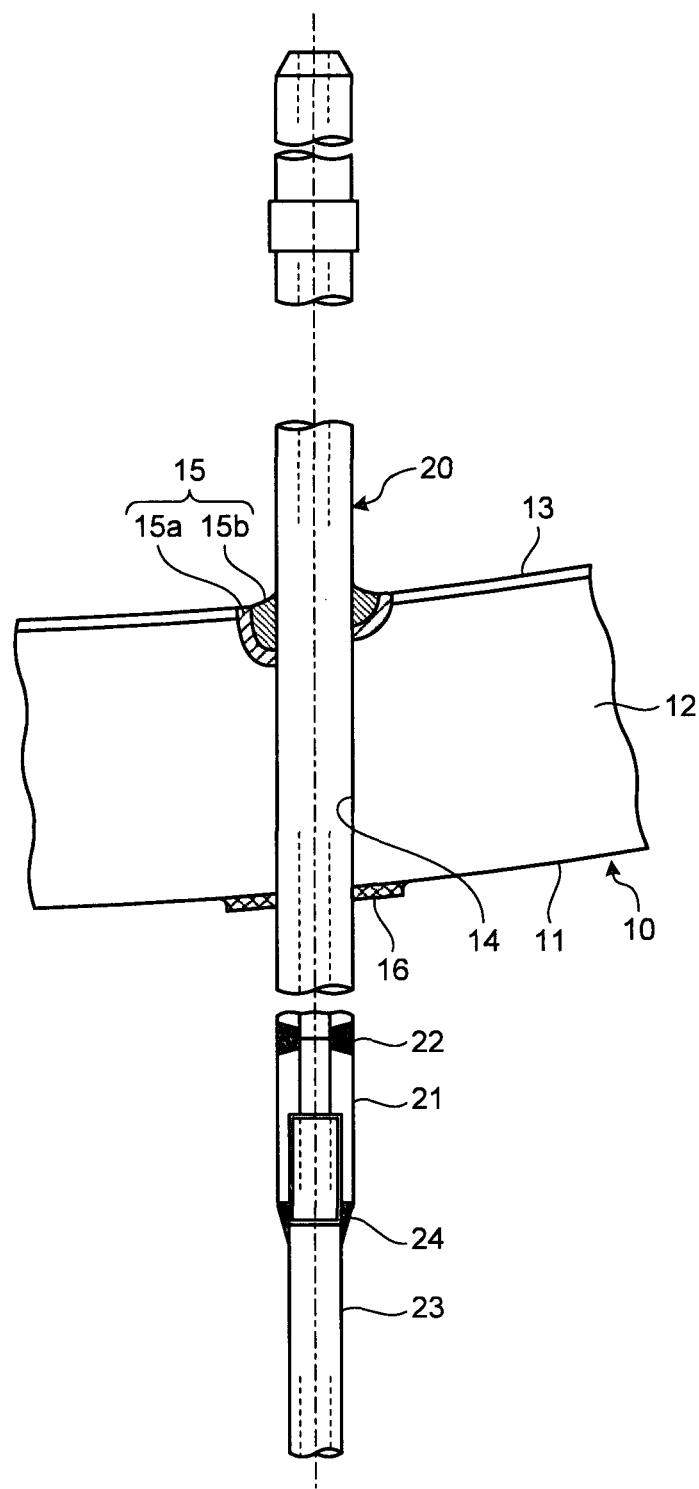
FIG. 1 is a schematic diagram of a nozzle mounting structure before replacement.

A nozzle mounting structure explained below is for replacing a nozzle mounted on a hemispherical lower head in a reactor vessel in maintenance and repair. As shown in FIG. 1, in the nozzle mounting structure before replacement, a nozzle 20 is mounted on a lower head 11 formed in a hemispherical shape, which is a bottom of a reactor vessel 10, penetrating through the reactor vessel 10.

A base material 12 of the reactor vessel 10 is made of carbon steel or low alloy steel. An inner surface of the reactor vessel 10 is covered with a clad 13 overlay welded with stainless steel. In the reactor vessel 10, a through-hole 14 for enabling the nozzle 20 to penetrate therethrough is vertically provided at a position where the nozzle 20 is mounted. The through-hole 14 has a weld part 15 at a portion open to the inside of the reactor vessel 10. In the weld part 15, grooving is performed with respect to the base material 12 inside of the reactor vessel 10, and stainless steel or Ni-base alloy is overlay welded to a slotted portion (an overlay weld part 15a). Further, the overlay weld part 15a of the weld part 15 is slotted, and stainless steel or Ni-base alloy is joint-welded to the slotted portion (a joint weld part 15b). The nozzle 20 penetrating through the through-hole 14 is fixed with respect to the reactor vessel 10 by the joint weld part 15b. The through-hole 14 has a weld part 16 at a portion open to outside of the reactor vessel 10. In the weld part 16, stainless steel or Ni-base alloy is overlay welded.

The nozzle 20 is formed as an in-core instrumentation tube for inserting and fixing a detector that measures in-core neutron flux of the reactor vessel 10. The nozzle 20 is made of stainless steel or Ni-base alloy. The nozzle 20 is inserted into the through-hole 14 to penetrate therethrough, and a safe end 21 is provided at a bottom end thereof extending outside of the reactor vessel 10. The safe end 21 is fixed to the bottom end of the nozzle 20 by joint welding of stainless steel or Ni-base alloy (a joint weld part 22). The safe end 21 is connected to a conduit tube 23. The safe end 21 and the conduit tube 23 are connected to each other by joint welding of stainless steel (a joint weld part 24).

[First Embodiment]

Figure 2:
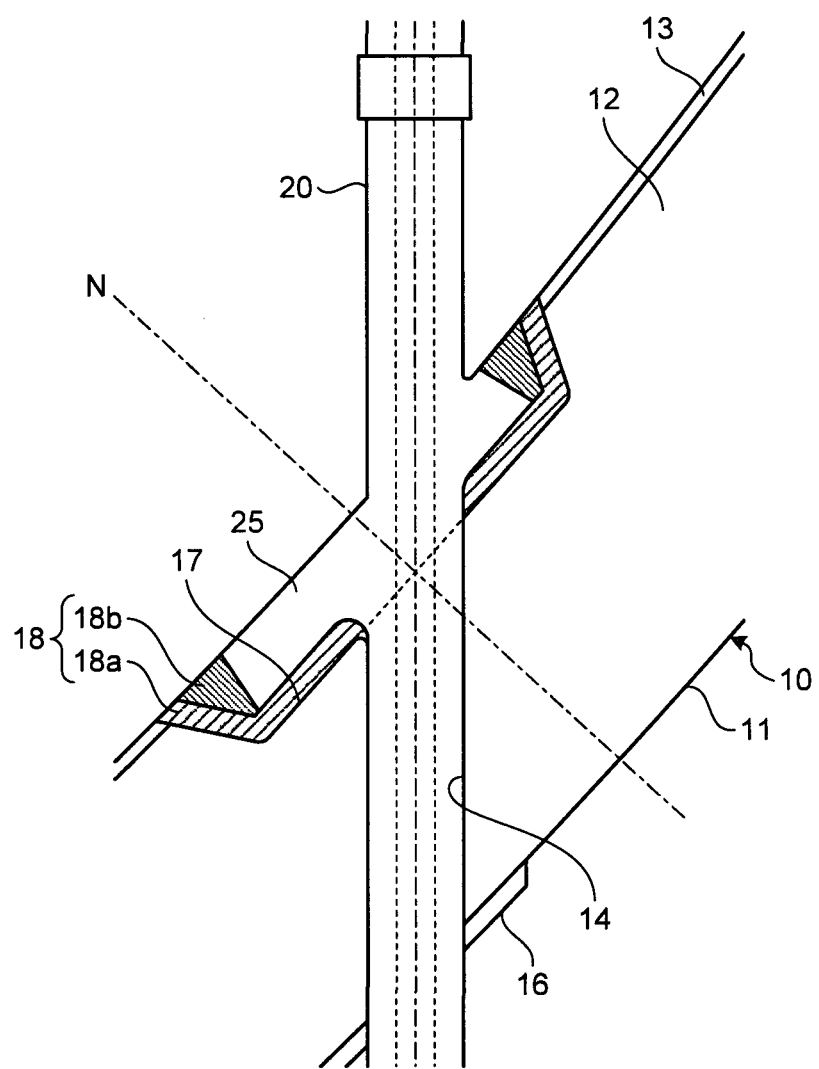
FIG. 2 is a schematic diagram of a nozzle mounting structure according to a first embodiment of the present invention.

FIG. 2 depicts a nozzle mounting structure according to a first embodiment of the present invention. As shown in FIG. 2, in the nozzle mounting structure according to the present embodiment, the nozzle 20 is detached from the reactor vessel 10 shown in FIG. 1, and a new nozzle 20 is mounted on the reactor vessel 10.

The nozzle mounting structure includes a removed concave portion 17 in which the base material 12 at an opening of the through-hole 14 is removed together with the weld part 15, on an inner surface side of the reactor vessel 10 after the nozzle 20 has been detached. The removed concave portion 17 is formed in a symmetrical shape around a normal line N on a hemispherical concave inner surface in the lower head 11 of the reactor vessel 10. The symmetrical shape around the normal line N includes one having a circular outer diameter around the normal line N and one having a regular polygonal outer diameter around the normal line N.

The nozzle mounting structure also includes a flange 25 in the new nozzle 20. The flange 25 is to be inserted into the removed concave portion 17, and formed in the same symmetrical shape as that of the removed concave portion 17 around the normal line N.

The nozzle mounting structure also includes a weld part 18 for welding the flange 25 to the reactor vessel 10. The weld part 18 includes an overlay weld part 18a welded to the inner surface of the removed concave portion 17, and a joint weld part 18b for welding the flange 25 inserted into the removed concave portion 17 to the overlay weld part 18a. In the overlay weld part 18a, stainless steel or Ni-base alloy is overlay welded to a slotted portion of the removed concave portion 17, and in the joint weld part 18b, stainless steel or Ni-base alloy is joint welded to a slotted portion of the overlay weld part 18a.

In a method of forming the nozzle mounting structure, first, an underwater environment inside the reactor vessel 10 is changed to an atmospheric environment.

The removed concave portion 17 is then formed after the existing nozzle 20 is detached. Specifically, a cutting machine is arranged around the normal line N on the hemispherical concave inner surface in the lower head 11 of the reactor vessel 10, to cut the base material 12 at the opening of the through-hole 14 together with the weld part 15. Thereafter, a cut groove surface is externally observed by a camera, and size measurement and PT testing (penetrant testing) are performed. Accordingly, the removed concave portion 17 is formed in the symmetrical shape around the normal line N. Because the removed concave portion 17 is formed around the normal line N, high accuracy can be ensured.

Next, the overlay weld part 18a of the weld part 18 is formed. Specifically, a backing plug is fitted to a portion where the through-hole 14 is opened in the removed concave portion 17, to prevent an overlay weld from entering into the through-hole 14. Thereafter, a heater is fitted along the inner surface of the lower head 11, which is an outer edge of the removed concave portion 17, to perform preheating before buttered welding (for example, to 150° C. or higher). A welding apparatus is arranged around the normal line N to perform buttered welding. Thereafter, the heater is fitted along the inner surface of the lower head 11, which is the outer edge of the removed concave portion 17, and the surface of the overlay weld part 18a, to perform heat treatment (for example, to 230° C. to 290° C.). Centering and positioning of a plug cutting and removing device are then performed with respect to the center of the through-hole 14, the backing plug is cut and removed, and machining of the through-hole 14 is performed. The heater is then fitted along the inner surface of the lower head 11, which is the outer edge of the removed concave portion 17, and the surface of the overlay weld part 18a, and a heater is arranged inside the through-hole 14 to perform heat treatment after buttered welding (for example, to 595° C. to 710° C.). It can be considered that the heat treatment after welding is not required by performing the buttered welding according to a temper bead welding method. Thereafter, a cutting device is arranged around the normal line N to form a groove. The groove surface is externally observed by the camera, and size measurement and PT testing (penetrant testing) are performed. Accordingly, the overlay weld part 18a is formed in the symmetrical shape around the normal line N inside the removed concave portion 17. Because the overlay weld part 18a is formed around the normal line N, high accuracy can be ensured.

A new nozzle 20 is inserted into the through-hole 14 from the inside of the reactor vessel 10, and the flange 25 is fitted to the overlay weld part 18a. The flange 25 is separately formed in a factory or the like, and thus high accuracy can be ensured.

The joint weld part 18b of the weld part 18 is then formed. Specifically, the welding apparatus is arranged around the normal line N to perform joint welding. It is then confirmed if there is any collapse of the nozzle 20 by the camera. Thereafter, a finishing device is arranged around the normal line N to perform finishing work. The PT testing (penetrant testing) of the joint welding is performed. Accordingly, the joint weld part 18b is formed in the symmetrical shape around the normal line N between the flange 25 and the overlay weld part 18a. Because the joint weld part 18b is formed around the normal line N, high accuracy can be ensured. As a result, the new nozzle 20 is mounted on the reactor vessel 10.

In this manner, the nozzle mounting structure according to the first embodiment described above includes the removed concave portion 17 in which the base material 12 on the inner surface side of the reactor vessel 10 is removed in the symmetrical shape around the normal line N on the hemispherical concave inner surface of the reactor vessel 10, the flange 25 provided on the nozzle 20, formed in the same symmetrical shape as that of the removed concave portion 17 around the normal line N, and inserted into the removed concave portion 17, and the weld part 18 provided around the normal line N for welding the flange 25 to the reactor vessel 10.

According to the nozzle mounting structure, grooving of the removed concave portion 17, positioning of the nozzle 20 in the flange 25, and welding of the flange 25 with respect to the reactor vessel 10 can be performed around the normal line N on the hemispherical concave inner surface of the reactor vessel 10, thereby enabling to facilitate mounting of the nozzle 20.

Figure 3:
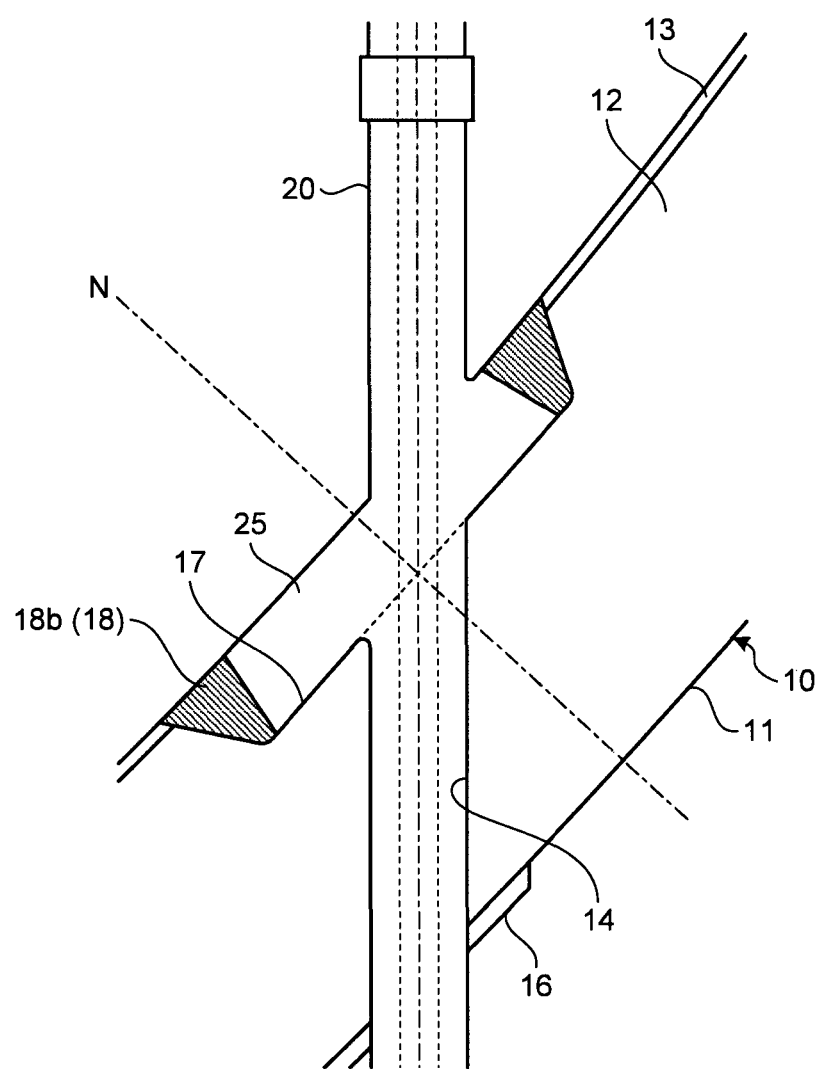
FIG. 3 is a schematic diagram of another example of the nozzle mounting structure according to the first embodiment of the present invention.

In the nozzle mounting structure according to the first embodiment, a mode in which the weld part 18 includes the overlay weld part 18a and the joint weld part 18b is explained; however, the present invention is not limited thereto. For example, as another example of the first embodiment, as shown in FIG. 3, the weld part 18 can include only the joint weld part 18b.

In this case, in a method of forming the nozzle mounting structure, first, an underwater environment inside the reactor vessel 10 is changed to an atmospheric environment.

The removed concave portion 17 is formed after the existing nozzle 20 is detached. Specifically, a cutting machine is arranged around the normal line N on the hemispherical concave inner surface in the lower head 11 of the reactor vessel 10, to cut the base material 12 at the opening of the through-hole 14 together with the weld part 15. Thereafter, a cut groove surface is externally observed by a camera, and size measurement and PT testing (penetrant testing) are performed. Accordingly, the removed concave portion 17 is formed in the symmetrical shape around the normal line N. Because the removed concave portion 17 is formed around the normal line N, high accuracy can be ensured.

A new nozzle 20 is inserted into the through-hole 14 from the inside of the reactor vessel 10, and the flange 25 is fitted to the removed concave portion 17. The nozzle 20 is separately formed in a factory or the like, and thus high accuracy can be ensured, including the flange 25.

The joint weld part 18b of the weld part 18 is then formed. Specifically, a heater is fitted along the inner surface of the lower head 11, which is the outer edge of the removed concave portion 17, to perform preheating before buttered welding (for example, to 150° C. or higher). A welding apparatus is then arranged around the normal line N to perform joint welding. Thereafter, the heater is fitted along the inner surface of the lower head 11, which is the outer edge of the removed concave portion 17, and an outer surface of the reactor vessel 10, which is a circumference of the nozzle 20, to perform heat treatment after joint welding (for example, to 595° C. to 710° C.). It is then confirmed if there is any collapse of the nozzle 20 by the camera. Thereafter, a finishing device is arranged around the normal line N to perform finishing work. The PT testing (penetrant testing) of the joint welding is performed. Accordingly, the joint weld part 18b is formed in the symmetrical shape around the normal line N between the flange 25 and the removed concave portion 17. Because the joint weld part 18b is formed around the normal line N, high accuracy can be ensured. As a result, the new nozzle 20 is mounted on the reactor vessel 10.

According to the nozzle mounting structure, because the overlay weld part 18a (buttered welding) is not required, operation processes can be reduced, and thus mounting of the nozzle 20 can be further facilitated.

Figure 4:
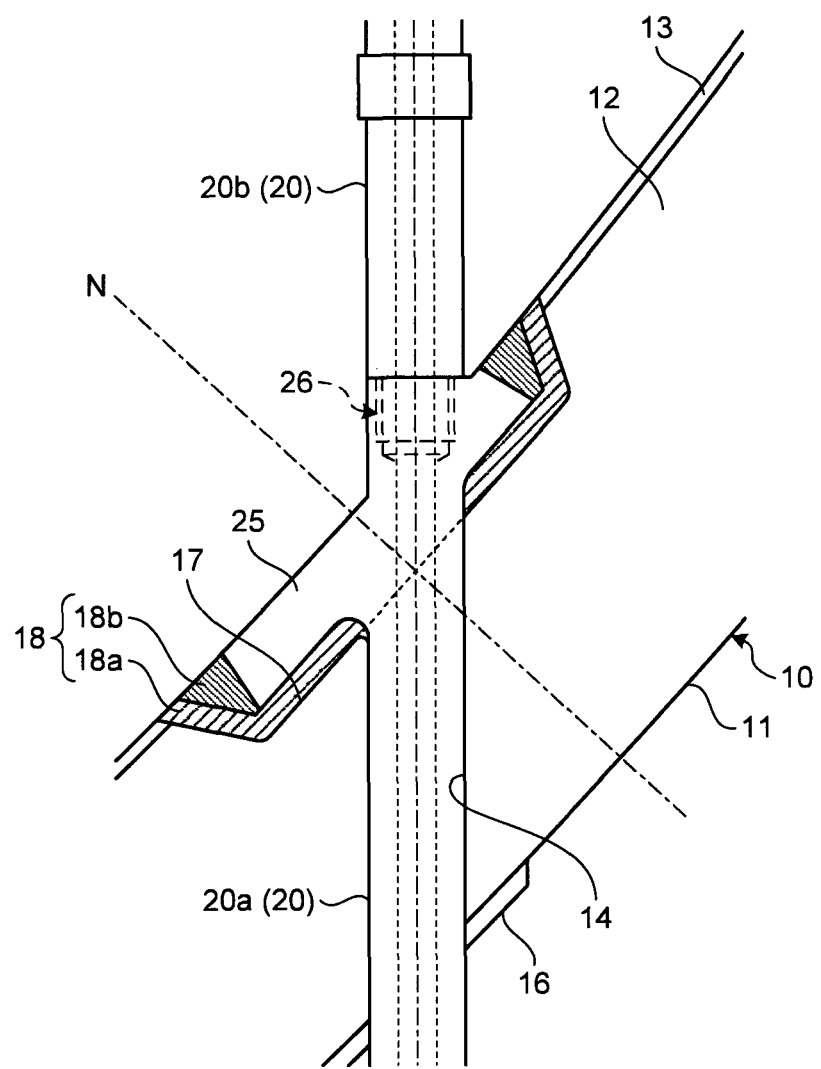
FIG. 4 is a schematic diagram of another example of the nozzle mounting structure according to the first embodiment of the present invention.
Figure 5:
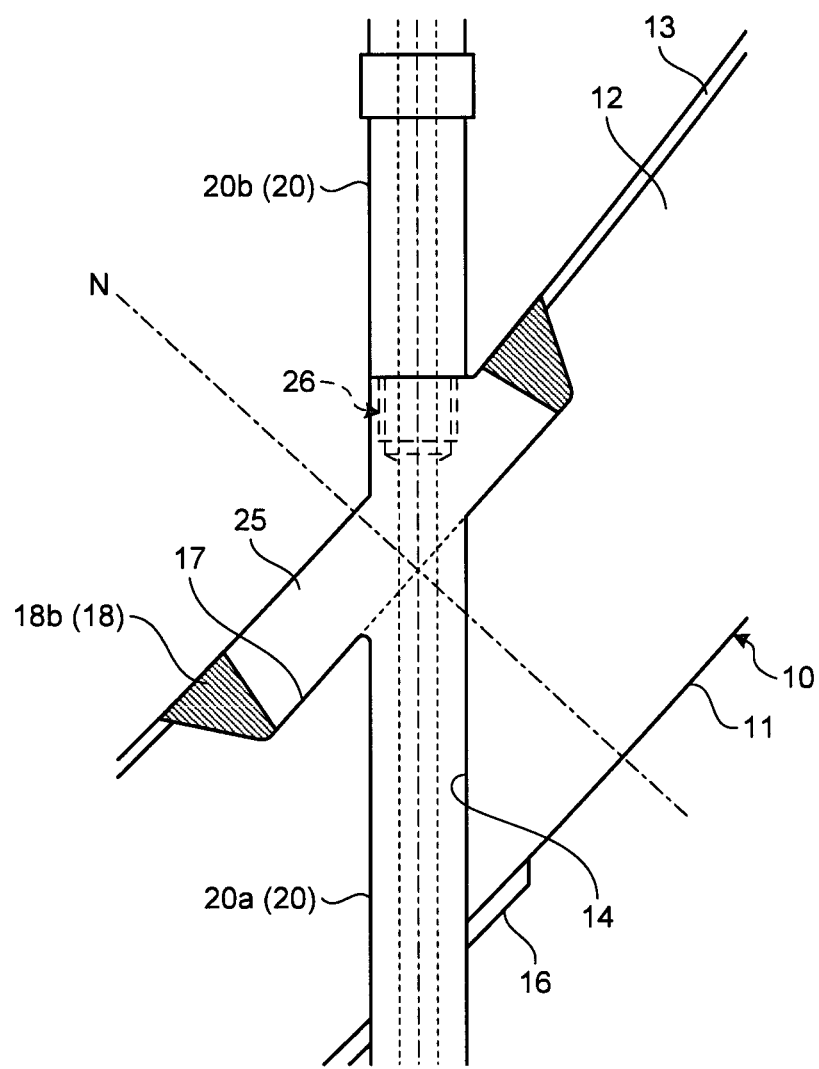
FIG. 5 is a schematic diagram of another example of the nozzle mounting structure according to the first embodiment of the present invention.

As another example of the first embodiment, as shown in FIGS. 4 and 5, it is desired that the nozzle 20 is divided into an outer nozzle 20a including the flange 25 and extending to outside of the reactor vessel 10, and an inner nozzle 20b arranged inside of the reactor vessel 10, which does not include the flange 25, and the outer nozzle 20a and the inner nozzle 20b are connected to each other. Connection between the outer nozzle 20a and the inner nozzle 20b is preferably performed by using a screw joint 26 shown in FIGS. 4 and 5. Alternatively, connection between the outer nozzle 20a and the inner nozzle 20b can be performed in a form of generally connecting tubes such as welding or caulking.

When the joint weld part 18b of the weld part 18 is provided, if the inner nozzle 20b is divided from the outer nozzle 20b, the inner nozzle 20b is not present in the trajectory for performing joint welding in a symmetrical shape around the normal line, thereby facilitating operations. Further, a forest of nozzles 20 is present on the inner side of the reactor vessel 10, and there is only a narrow space between adjacent nozzles 20. A wide work space can be ensured by dividing the inner nozzle 20b from the outer nozzle 20a, thereby facilitating operations. Accordingly, mounting of the nozzle 20 can be further facilitated. In order that the inner nozzle 20b is not present in the trajectory for performing joint welding in the symmetrical shape around the normal line, it is desired that a divided position between the outer nozzle 20a and the inner nozzle 20b approaches the flange 25 without limit.

When the inner nozzle 20b is not divided from the outer nozzle 20a and the nozzle 20 is integrally constructed as shown in FIGS. 2 and 3, there is an advantage that any connection work between the outer nozzle 20a and the inner nozzle 20b is not required.

[Second Embodiment]

Figure 6:
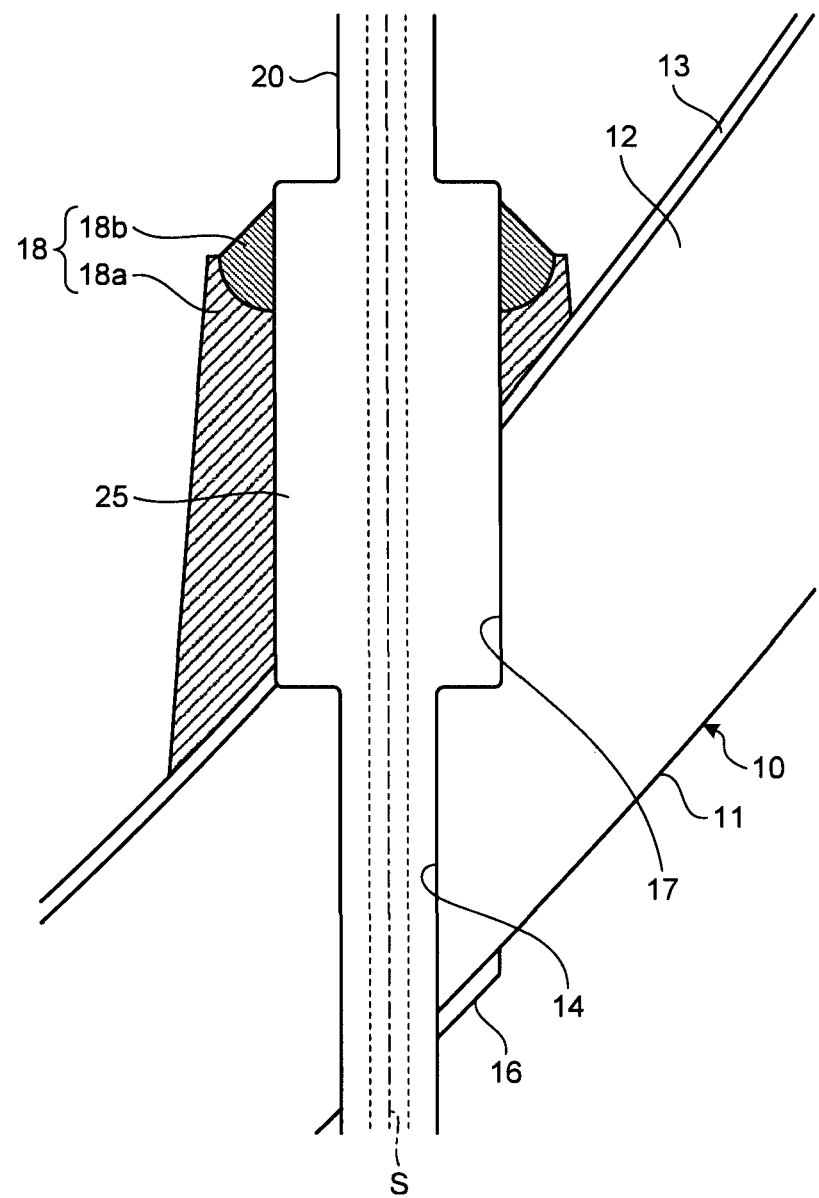
FIG. 6 is a schematic diagram of a nozzle mounting structure according to a second embodiment of the present invention.

A second embodiment of the present invention is explained with reference to the drawings. As shown in FIG. 6, in the nozzle mounting structure according to the present embodiment, the nozzle 20 is detached from the reactor vessel 10 shown in FIG. 1, and a new nozzle 20 is mounted on the reactor vessel 10.

The nozzle mounting structure includes the removed concave portion 17 in which the base material 12 at an opening of the through-hole 14 is removed together with the weld part 15, on an inner surface side of the reactor vessel 10 after the nozzle 20 has been detached. The removed concave portion 17 is formed based on a symmetrical shape around a centerline S of the nozzle 20 (the through-hole 14 at the time of construction). The symmetrical shape around the centerline S includes one having a circular outer diameter around the centerline S and one having a regular polygonal outer diameter around the centerline S.

The nozzle mounting structure also includes the flange 25 in the new nozzle 20. The flange 25 is to be inserted into the removed concave portion 17 and protrude to outside of the removed concave portion 17, and formed in the same symmetrical shape as that of the removed concave portion 17 around the centerline S.

The nozzle mounting structure also includes the weld part 18 for welding the flange 25 to the reactor vessel 10. The weld part 18 includes the overlay weld part 18a welded to a surface of the clad 13 provided on the inner surface of the reactor vessel 10 based on the symmetrical shape around the centerline S and over an outer circumference of the flange 25 protruding to outside of the removed concave portion 17, and the joint weld part 18b for welding the flange 25 to the overlay weld part 18a. In the overlay weld part 18a, stainless steel or Ni-base alloy is overlay welded, and in the joint weld part 18b, stainless steel or Ni-base alloy is joint-welded to a slotted portion of the overlay weld part 18a.

In a method of forming the nozzle mounting structure, first, an underwater environment inside the reactor vessel 10 is changed to an atmospheric environment.

The removed concave portion 17 is formed after the existing nozzle 20 is detached. Specifically, a cutting machine is arranged around the centerline S of the through-hole 14, to cut the base material 12 at the opening of the through-hole 14 together with the weld part 15. Thereafter, a cut groove surface and the surface of the clad 13 on which the overlay weld part 18*a* is formed later are externally observed by a camera, and size measurement and PT testing (penetrant testing) are performed. Accordingly, the removed concave portion 17 is formed based on the symmetrical shape around the centerline S in a hemispherical concave portion in the lower head 11 of the reactor vessel 10. Because the removed concave portion 17 is formed around the centerline S, high accuracy can be ensured.

The overlay weld part 18*a* of the weld part 18 is provided next. Specifically, a backing plug is fitted to a portion where the removed concave portion 17 is opened, to prevent an overlay weld from entering into the removed concave portion 17. Thereafter, a welding device is arranged around the centerline S to perform buttered welding on the surface of the clad 13. Centering and positioning of a plug cutting and removing device are then performed with respect to the centerline S of the through-hole 14, the backing plug is cut and removed, and machining of the overlay weld part 18*a* and the through-hole 14 is performed. Thereafter, the cutting device is arranged around the centerline S to form a groove. A groove surface is externally observed by the camera, and size measurement and PT testing (penetrant testing) are performed. Accordingly, the overlay weld part 18*a* is formed based on the symmetrical shape around the centerline S on the surface of the clad 13, which is the outer edge of the removed concave portion 17. Because the overlay weld part 18*a* is formed around the centerline S, high accuracy can be ensured.

A new nozzle 20 is inserted into the through-hole 14 from the inside of the reactor vessel 10, and the flange 25 is fitted into the overlay weld part 18*a*. The nozzle 20 is separately formed in a factory or the like, and thus high accuracy can be ensured while including the flange 25.

The joint weld part 18*b* of the weld part 18 is then formed. Specifically, the welding apparatus is arranged around the centerline S to perform joint welding. It is then confirmed if there is any collapse of the nozzle 20 by the camera. Thereafter, a finishing device is arranged around the centerline S to perform finishing work. The PT testing (penetrant testing) of the joint welding is performed. Accordingly, the joint weld part 18*b* is formed in the symmetrical shape around the centerline S between the flange 25 and the overlay weld part 18*a*. Because the joint weld part 18*b* is formed around the centerline S, high accuracy can be ensured. As a result, the new nozzle 20 is mounted on the reactor vessel 10.

In this manner, the nozzle mounting structure according to the second embodiment described above includes the removed concave portion 17 in which the base material 12 on the inner surface side of the reactor vessel 10 is removed based on the symmetrical shape around the centerline S of the nozzle 20, the flange 25 provided on the nozzle 20, formed in the symmetrical shape around the centerline S, and inserted into the removed concave portion 17 and protruding to outside of the removed concave portion 17, the overlay weld part 18*a* welded to the surface of the clad 13 provided on the inner surface of the reactor vessel 10 based on the symmetrical shape around the centerline S and over the outer circumference of the flange 25 protruding to the outside of the removed concave portion 17, and the joint weld part 18*b* for welding the flange 25 to the overlay weld part 18*a* around the centerline S.

According to the nozzle mounting structure, grooving of the removed concave portion 17, positioning of the nozzle 20 in the flange 25, and welding of the flange 25 with respect to the reactor vessel 10 can be performed around the centerline of the nozzle 20, thereby enabling to facilitate mounting of the nozzle 20. Further, because the overlay weld part 18*a* is welded to the surface of the clad 13 and over the outer circumference of the flange 25 protruding to the outside of the removed concave portion 17, and does not come in contact with the base material 12 of the removed concave portion 17, any heating operation is not required. Therefore, operation processes can be reduced, and thus mounting of the nozzle 20 can be further facilitated.

[Third Embodiment]

Figure 7:
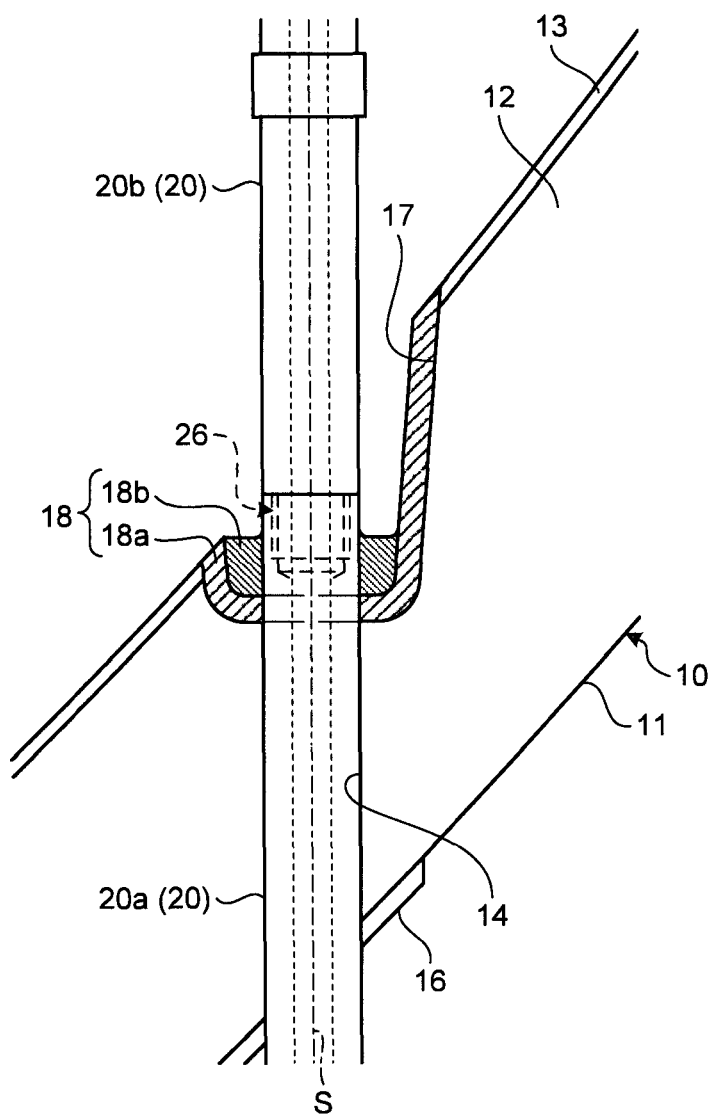
FIG. 7 is a schematic diagram of a nozzle mounting structure according to a third embodiment of the present invention.

A third embodiment of the present invention is explained with reference to the drawings. As shown in FIG. 7, in the nozzle mounting structure according to the present embodiment, the nozzle 20 is detached from the reactor vessel 10 shown in FIG. 1, and a new nozzle 20 is mounted on the reactor vessel 10.

The nozzle mounting structure includes the removed concave portion 17 in which the base material 12 at an opening of the through-hole 14 is removed together with the weld part 15, on an inner surface side of the reactor vessel 10 after the nozzle 20 has been detached. The removed concave portion 17 is formed based on a symmetrical shape around the centerline S of the nozzle 20 (the through-hole 14 at the time of construction). The symmetrical shape around the centerline S includes one having a circular outer diameter around the centerline S and one having a regular polygonal outer diameter around the centerline S.

The nozzle mounting structure includes the weld part 18 for welding a new nozzle 20 to the reactor vessel 10. The weld part 18 includes the overlay weld part 18*a* welded to an inner surface of the removed concave portion 17 around the centerline S and the joint weld part 18*b* for welding the nozzle 20 to the overlay weld part 18*a* around the centerline S. In the overlay weld part 18*a*, stainless steel or Ni-base alloy is overlay welded, and in the joint weld part 18*b*, stainless steel or Ni-base alloy is joint-welded to a slotted portion of the overlay weld part 18*a*.

In a method of forming the nozzle mounting structure, first, an underwater environment inside the reactor vessel 10 is changed to an atmospheric environment.

The removed concave portion 17 is then formed after the existing nozzle 20 is detached. Specifically, a cutting machine is arranged around the centerline S of the through-hole 14, to cut the base material 12 at the opening of the through-hole 14 together with the weld part 15. Thereafter, a cut groove surface is externally observed by a camera, and size measurement and PT testing (penetrant testing) are performed. Accordingly, the removed concave portion 17 is formed based on the symmetrical shape around the centerline S in a hemispherical concave portion in the lower head 11 of the reactor vessel 10. Because the removed concave portion 17 is formed around the centerline S, high accuracy can be ensured.

The overlay weld part 18*a* of the weld part 18 is provided next. Specifically, a backing plug is fitted to a portion where the through-hole 14 is opened in the removed concave portion 17, to prevent an overlay weld from entering into the through-hole 14. Thereafter, a heater is fitted along the inner surface of the lower head 11, which is an outer edge of the removed concave portion 17, to perform preheating before buttered welding (for example, to 150° C. or higher). A welding apparatus is arranged around the centerline S to perform buttered welding. Thereafter, the heater is fitted along the inner surface of the lower head 11, which is the outer edge of the removed concave portion 17, and along the surface of the overlay weld part 18*a*, to perform heat treatment (for example, to 230° C. to 290° C.). Centering and positioning of a plug cutting and removing device are then performed with respect to the center of the through-hole 14, the backing plug is cut and removed, and machining of the through-hole 14 is performed. The heater is then fitted along the inner surface of the lower head 11, which is the outer edge of the removed concave portion 17, and along the surface of the overlay weld part 18a, and a heater is arranged inside the through-hole 14 to perform heat treatment after buttered welding (for example, to 595° C. to 710° C.). It can be considered that the heat treatment after welding is not required by performing the buttered welding according to the temper bead welding method. Thereafter, the cutting device is arranged around the centerline S to form a groove. A groove surface is externally observed by the camera, and size measurement and PT testing (penetrant testing) are performed. Accordingly, the overlay weld part 18a is formed based on the symmetrical shape around the centerline S inside the removed concave portion 17. Because the overlay weld part 18a is formed around the centerline S, high accuracy can be ensured.

A new nozzle 20 is inserted into the through-hole 14 from the inside of the reactor vessel 10.

The joint weld part 18b of the weld part 18 is then formed. Specifically, the welding apparatus is arranged around the centerline S to perform joint welding. It is then confirmed if there is any collapse of the nozzle 20 by the camera. Thereafter, a finishing device is arranged around the centerline S to perform finishing work. The PT testing (penetrant testing) of the joint welding is performed. Accordingly, the joint weld part 18b is formed in the symmetrical shape around the centerline S between the nozzle 20 and the overlay weld part 18a. Because the joint weld part 18b is formed around the centerline S, high accuracy can be ensured. As a result, the new nozzle 20 is mounted on the reactor vessel 10.

In this manner, the nozzle mounting structure according to the third embodiment described above includes the removed concave portion 17 in which the base material 12 on the inner surface side of the reactor vessel 10 is removed based on the symmetrical shape around the centerline S of the nozzle 20, the overlay weld part 18a welded to the inner surface of the removed concave portion 17 around the centerline S, and the joint weld part 18b for welding the nozzle 20 inserted into the removed concave portion 17 to the overlay weld part 18a around the centerline S.

According to the nozzle mounting structure, grooving of the removed concave portion 17, positioning of the nozzle 20, and welding of the nozzle 20 with respect to the reactor vessel 10 can be performed around the centerline S of the nozzle 20, thereby enabling to facilitate mounting of the nozzle 20.

Further, as shown in FIG. 7, in the nozzle mounting structure according to the third embodiment, it is desired that the nozzle 20 is divided into the outer nozzle 20a including a welded portion by the joint weld part 18b and extending to the outside of the reactor vessel 10, and the inner nozzle 20b arranged inside of the reactor vessel 10, which does not include the welded portion by the joint weld part 18b, and the outer nozzle 20a and the inner nozzle 20b are connected to each other. Connection between the outer nozzle 20a and the inner nozzle 20b is preferably performed by using the screw joint 26. Alternatively, connection between the outer nozzle 20a and the inner nozzle 20b can be performed in a form of generally connecting tubes such as welding or caulking.

When the joint weld part 18b of the weld part 18 is provided, if the inner nozzle 20b is divided from the outer nozzle 20a, the inner nozzle 20b is not present on the centerline S, thereby facilitating a joint welding operation. Further, a forest of nozzles is present on the inner side of the reactor vessel 10, and there is only a little space between adjacent nozzles 20. A wide work space can be ensured by dividing the inner nozzle 20b from the outer nozzle 20a, thereby facilitating operations. Accordingly, mounting of the nozzle 20 can be performed more easily. To facilitate the joint welding operation, it is desired that a divided position between the outer nozzle 20a and the inner nozzle 20b approaches the joint weld part 18b without limit.

When the outer nozzle 20a and the inner nozzle 20b are not divided and the nozzle 20 is integrally constructed, though not shown, there is an advantage that a connection work between the outer nozzle 20a and the inner nozzle 20b is not required.

In the third embodiment described above, the weld part 18 includes the overlay weld part 18a welded to the inner surface of the removed concave portion 17 around the centerline S and the joint weld part 18b for welding the nozzle 20 to the overlay weld part 18a around the centerline S. However, the present invention is not limited thereto. For example, the weld part 18 can be provided around the centerline S for welding a new nozzle 20 inserted into the removed concave portion 17 to the reactor vessel 10. Specifically, in the weld part 18, the joint weld part 18b is joint welded in a form of fixing the nozzle 20 to the reactor vessel 10, and the overlay weld part 18a is overlay welded in such a form that there is no weld part 18b in the removed concave portion 17 and the surface of the base material 12 appearing on the inside of the reactor vessel 10 is covered. Even by this configuration, the effects of the third embodiment can be obtained.

[Fourth Embodiment]

Figure 8:
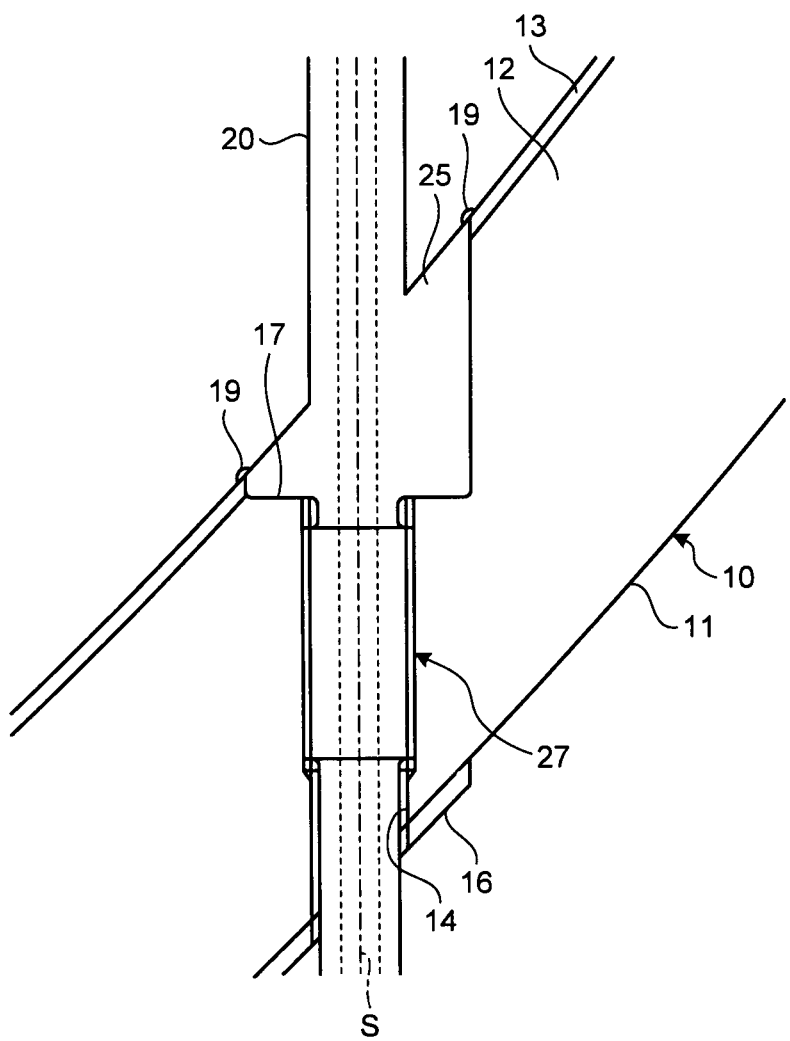
FIG. 8 is a schematic diagram of a nozzle mounting structure according to a fourth embodiment of the present invention.

A fourth embodiment of the present invention is explained with reference to the drawings. As shown in FIG. 8, in the nozzle mounting structure according to the present embodiment, the nozzle 20 is detached from the reactor vessel 10 shown in FIG. 1, and a new nozzle 20 is mounted on the reactor vessel 10.

The nozzle mounting structure includes the removed concave portion 17 in which the base material 12 at an opening of the through-hole 14 is removed together with the weld part 15, on an inner surface side of the reactor vessel 10 after the nozzle 20 has been detached. The removed concave portion 17 is formed based on a symmetrical shape around the centerline S of the nozzle 20 (the through-hole 14 at the time of construction). The symmetrical shape around the centerline S includes one having a circular outer diameter around the centerline S and one having a regular polygonal outer diameter around the centerline S.

The nozzle mounting structure also includes the flange 25 in the new nozzle 20. The flange 25 is inserted into the removed concave portion 17, and formed in the same symmetrical shape as that of the removed concave portion 17 around the centerline S, which becomes flush with the clad 13 provided on the inner surface of the reactor vessel 10.

The nozzle mounting structure also includes a sealing part 19 for sealing between the clad 13 and the flange 25. The sealing part 19 is constituted as a seal weld part, which is seal welded between the clad 13 and the flange 25 around the centerline S. Alternatively, the sealing part 19 can be a filling material to be filled in a gap between the clad 13 and the flange 25. The filling material includes, for example, a resin material.

The nozzle mounting structure also includes a fixing part 27 for fixing an outer surface of the nozzle 20 to the inner surface of the through-hole 14. The fixing part 27 according to the present embodiment has a threaded structure in which the outer surface of the nozzle 20 and the inner surface of the through-hole 14 are screwed together and fixed.

In a method of forming the nozzle mounting structure, first, the inside of the reactor vessel 10 remains in an underwater environment.

The removed concave portion 17 is formed after the existing nozzle 20 is detached. Specifically, a cutting machine is arranged around the centerline S of the through-hole 14, to cut the base material 12 at the opening of the through-hole 14 together with the weld part 15. Thereafter, the fixing part 27 is formed. Specifically, an internal thread is machined in the through-hole 14. A cut groove surface is externally observed by a camera, and size measurement and PT testing (penetrant testing) are performed. Accordingly, the removed concave portion 17 and the fixing part 27 are formed based on the symmetrical shape around the centerline S in a hemispherical concave portion in the lower head 11 of the reactor vessel 10. Because the removed concave portion 17 and the internal thread of the fixing part 27 are formed around the centerline S, high accuracy can be ensured.

A new nozzle 20 is inserted into the through-hole 14 from the inside of the reactor vessel 10, the flange 25 is fitted into the removed concave portion 17, and the nozzle 20 is fixed in the through-hole 14 by the fixing part (internal thread and external thread) 27. Thereafter, it is confirmed if there is any collapse of the nozzle 20 by the camera. The nozzle 20 is separately formed in a factory or the like, and thus high accuracy can be ensured while including the flange 25 and the fixing part (external thread) 27.

The sealing part (seal weld part) 19 is then provided. Specifically, a welding device is arranged around the centerline S to perform seal welding. Thereafter, the seal welding is inspected. Accordingly, the gap between the flange 25 and the clad 13 is sealed. Because the seal welding is performed around the centerline S, high accuracy can be ensured. As a result, the new nozzle 20 is mounted on the reactor vessel 10.

In this manner, the nozzle mounting structure according to the fourth embodiment described above includes the removed concave portion 17 in which the base material 12 on the inner surface side of the reactor vessel 10 is removed based on the symmetrical shape around the centerline S of the nozzle 20, the flange 25 provided on the nozzle 20, formed in the symmetrical shape around the centerline S, and inserted into the removed concave portion 17, the sealing part 19 that seals between the clad 13 provided on the inner surface of the reactor vessel 10 and the flange 25 around the centerline S, and the fixing part 27 that fixes the nozzle 20 in the through-hole 14 of the reactor vessel 10.

According to the nozzle mounting structure, grooving of the removed concave portion 17, positioning of the nozzle 20 in the flange 25, and, seal-up and fixation of the flange 25 with respect to the reactor vessel 10 can be performed around the centerline S of the nozzle 20. Accordingly, mounting of the nozzle 20 can be easily performed. Further, because buttered welding is not performed due to having the sealing part 19 and the fixing part 27, any buttered welding operation and heating operation are not required, thereby enabling to reduce operation processes considerably and further facilitate mounting of the nozzle 20.

Particularly, according to the nozzle mounting structure of the fourth embodiment, joint welding, buttered welding, and heat treatment required in the first to third embodiments are not required, construction can be performed in an underwater environment, and an operation for creating an atmospheric environment is not required. Therefore, operation processes can be considerably reduced, and thus mounting of the nozzle 20 can be performed more easily.

Figure 9:
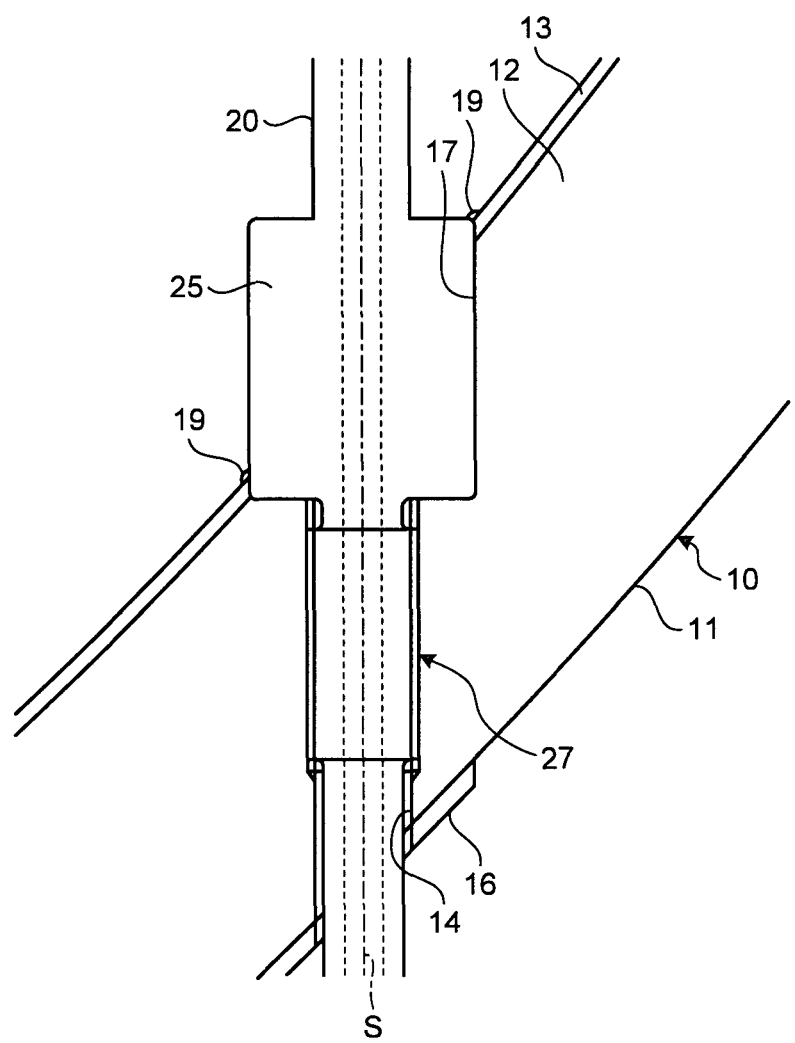
FIG. 9 is a schematic diagram of another example of the nozzle mounting structure according to the fourth embodiment of the present invention.

As another example of the fourth embodiment, it is desired that the flange 25 is formed as shown in FIG. 9. Specifically, the flange 25 is formed based on the same symmetrical shape as that of the removed concave portion 17 around the centerline S, as in the fourth embodiment. However, it is different from the fourth embodiment that the flange 25 is formed in a symmetrical shape around the centerline S. When the flange 25 is inserted into the removed concave portion 17, and the nozzle 20 is fixed by the fixing part 27, a part of the flange 25 protrudes from the clad 13 provided on the inner surface of the reactor vessel 10. The sealing part 19 is provided in a boundary between the clad 13 and the flange 25.

In this manner, by forming the flange 25 in the symmetrical shape around the centerline S, when the nozzle 20 is fixed in the through-hole 14 by the fixing part 27 having the threaded structure, the sealing part 19 can seal between the clad 13 and the flange 25, regardless of a threaded position. As a result, the workability is improved, thereby enabling to facilitate mounting of the nozzle 20 further.

Figure 10:
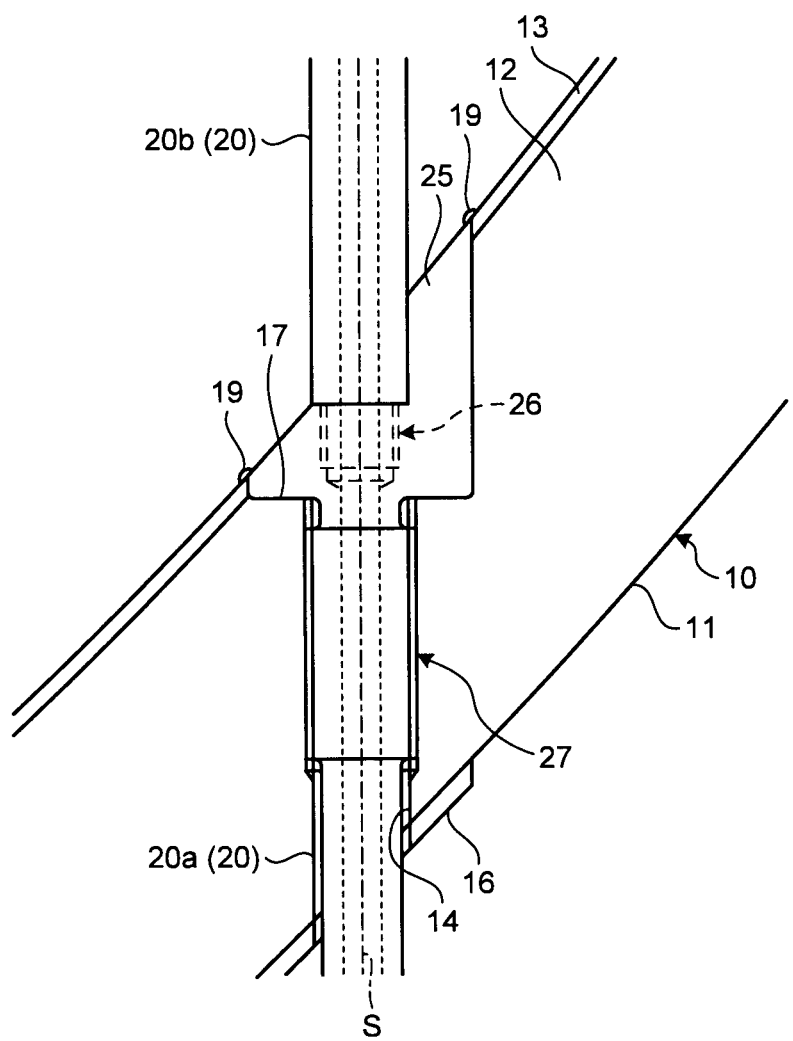
FIG. 10 is a schematic diagram of another example of the nozzle mounting structure according to the fourth embodiment of the present invention.
Figure 11:
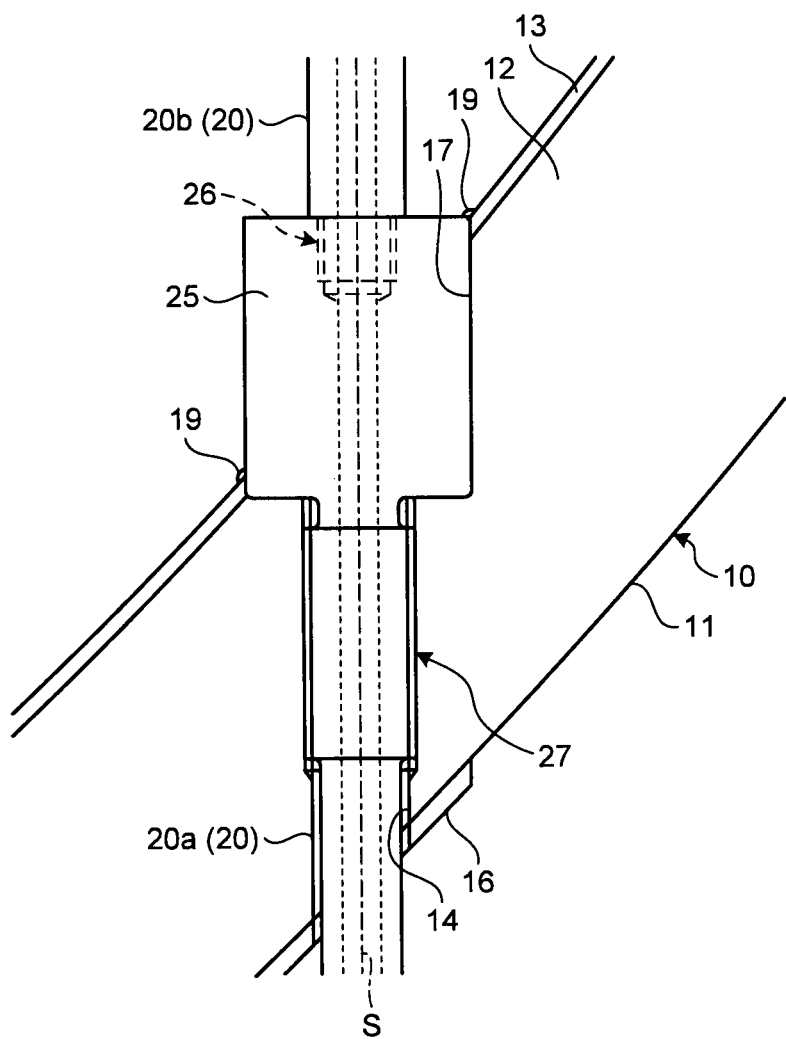
FIG. 11 is a schematic diagram of another example of the nozzle mounting structure according to the fourth embodiment of the present invention.

As another example of the fourth embodiment, as shown in FIGS. 10 and 11, it is desired that the nozzle 20 is divided into the outer nozzle 20a including the flange 25 and extending to the outside of the reactor vessel 10, and the inner nozzle 20b arranged inside of the reactor vessel 10, which does not include the flange 25, and the outer nozzle 20a and the inner nozzle 20b are connected to each other. Connection between the outer nozzle 20a and the inner nozzle 20b is preferably performed by using the screw joint 26 shown in FIGS. 10 and 11. Alternatively, connection between the outer nozzle 20a and the inner nozzle 20b can be performed in a form of generally connecting tubes such as welding or caulking.

When the sealing part 19 is provided, if the inner nozzle 20b is divided from the outer nozzle 20a, the inner nozzle 20b is not present on the centerline S, thereby facilitating construction of the sealing part 19. Further, a forest of nozzles is present on the inner side of the reactor vessel 10, and there is only a little space between adjacent nozzles 20. A wide work space can be ensured by dividing the inner nozzle 20b from the outer nozzle 20a, thereby facilitating operations. Accordingly, mounting of the nozzle 20 can be performed more easily. To facilitate construction of the sealing part 19, it is desired that a divided position between the outer nozzle 20a and the inner nozzle 20b approaches the flange 25 without limit.

When the outer nozzle 20a and the inner nozzle 20b are not divided and the nozzle 20 is integrally constructed as shown in FIGS. 8 and 9, there is an advantage that a connection work between the outer nozzle 20a and the inner nozzle 20b is not required.

[Fifth Embodiment]

Figure 12:
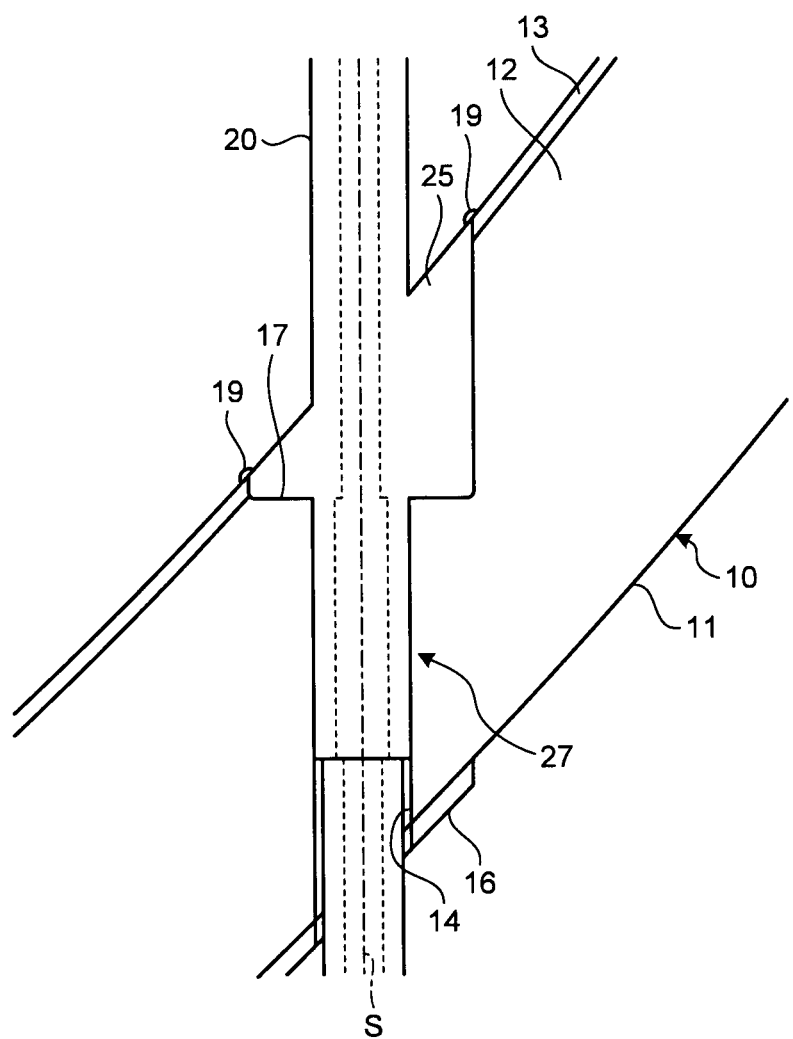
FIG. 12 is a schematic diagram of a nozzle mounting structure according to a fifth embodiment of the present invention.

A fifth embodiment of the present invention is explained with reference to the drawings. As shown in FIG. 12, in the nozzle mounting structure according to the present embodiment, the nozzle 20 is detached from the reactor vessel 10 shown in FIG. 1, and a new nozzle 20 is mounted on the reactor vessel 10.

The nozzle mounting structure includes the removed concave portion 17 in which the base material 12 at an opening of the through-hole 14 is removed together with the weld part 15, on an inner surface side of the reactor vessel 10 after the nozzle 20 has been detached. The removed concave portion 17 is formed based on a symmetrical shape around the centerline S of the nozzle 20 (the through-hole 14 at the time of construction). The symmetrical shape around the centerline S includes one having a circular outer diameter around the centerline S and one having a regular polygonal outer diameter around the centerline S.

The nozzle mounting structure also includes the flange 25 in the new nozzle 20. The flange 25 is inserted into the removed concave portion 17, and is formed in the same symmetrical shape as that of the removed concave portion 17 around the centerline S, which becomes flush with the clad 13 provided on the inner surface of the reactor vessel 10.

The nozzle mounting structure also includes the sealing part 19 for sealing between the clad 13 and the flange 25. The sealing part 19 is constituted as a seal weld part, which is seal welded between the clad 13 and the flange 25 around the centerline S. Alternatively, the sealing part 19 can be a filling material to be filled in a gap between the clad 13 and the flange 25. The filling material includes, for example, a resin material.

The nozzle mounting structure also includes the fixing part 27 for fixing an outer surface of the nozzle 20 to an inner surface of the through-hole 14. The fixing part 27 according to the present embodiment has a structure in which the nozzle 20 is expanded and an outer surface of the expanded nozzle 20 and the inner surface of the through-hole 14 are fixed by close attachment.

In a method of forming the nozzle mounting structure, first, the inside of the reactor vessel 10 remains in an underwater environment.

The removed concave portion 17 is formed after the existing nozzle 20 is detached. Specifically, a cutting machine is arranged around the centerline S of the through-hole 14, to cut the base material 12 at the opening of the through-hole 14 together with the weld part 15. Thereafter, a cut groove surface is externally observed by a camera, and size measurement and PT testing (penetrant testing) are performed. Accordingly, the removed concave portion 17 is formed based on the symmetrical shape around the centerline S in a hemispherical concave portion in the lower head 11 of the reactor vessel 10. Because the removed concave portion 17 is formed around the centerline S, high accuracy can be ensured.

A new nozzle 20 is inserted into the through-hole 14 from the inside of the reactor vessel 10, the flange 25 is fitted into the removed concave portion 17, and the nozzle 20 is fixed in the through-hole 14 by the fixing part (expanded nozzle) 27. Thereafter, it is confirmed if there is any collapse of the nozzle 20 by the camera. The nozzle 20 is separately formed in a factory or the like, and thus high accuracy can be ensured while including a portion for providing the flange 25 and the fixing part (expanded nozzle) 27.

The sealing part (seal weld part) 19 is then provided. Specifically, a welding device is arranged around the centerline S to perform seal welding. Thereafter, the seal welding is inspected. Accordingly, the gap between the flange 25 and the clad 13 is sealed. Because the seal welding is performed around the centerline S, high accuracy can be ensured. As a result, the new nozzle 20 is mounted on the reactor vessel 10. Either of fixation and seal welding of the nozzle 20 can be performed first.

Thus, the nozzle mounting structure according to the fifth embodiment includes the removed concave portion 17 in which the base material 12 on the inner surface side of the reactor vessel 10 is removed based on the symmetrical shape around the centerline S of the nozzle 20, the flange 25 provided on the nozzle 20, formed in the symmetrical shape around the centerline S, and inserted into the removed concave portion 17, the sealing part 19 that seals between the clad 13 provided on the inner surface of the reactor vessel 10 and the flange 25 around the centerline S, and the fixing part 27 that fixes the nozzle 20 in the through-hole 14 of the reactor vessel 10.

According to the nozzle mounting structure, grooving of the removed concave portion 17, positioning of the nozzle 20 in the flange 25, and seal-up and fixation of the flange 25 with respect to the reactor vessel 10 can be performed around the centerline S of the nozzle 20. Accordingly, mounting of the nozzle 20 can be easily performed. Further, because buttered welding is not performed due to having the sealing part 19 and the fixing part 27, any buttered welding operation and heating operation are not required, thereby enabling to reduce operation processes and facilitate mounting of the nozzle 20.

Particularly, according to the nozzle mounting structure of the fifth embodiment, joint welding, buttered welding, and heat treatment required in the first to third embodiments are not required, construction thereof can be performed in an underwater environment, and an operation for creating an atmospheric environment is not required. Therefore, operation processes can be considerably reduced, and thus mounting of the nozzle 20 can be performed more easily.

Figure 13:
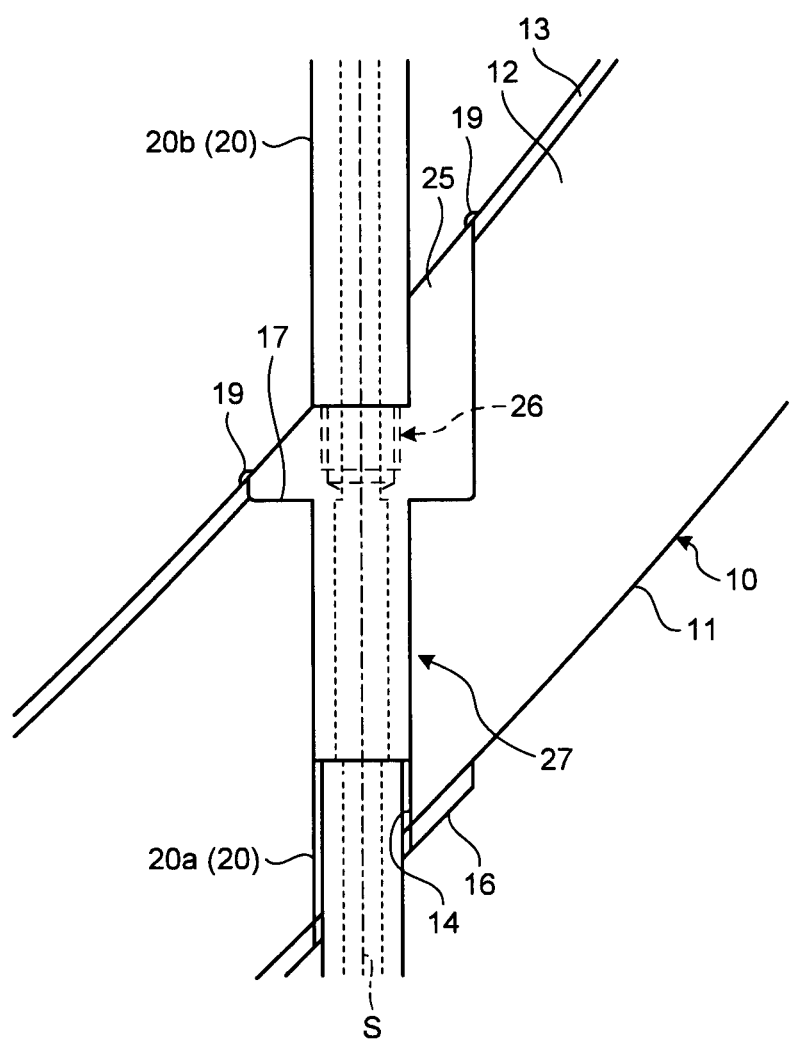
FIG. 13 is a schematic diagram of another example of the nozzle mounting structure according to the fifth embodiment of the present invention.

As another example of the fifth embodiment, as shown in FIG. 13, it is desired that the nozzle 20 is divided into the outer nozzle 20a including the flange 25 and extending to the outside of the reactor vessel 10, and the inner nozzle 20b arranged inside of the reactor vessel 10, which does not include the flange 25, and the outer nozzle 20a and the inner nozzle 20b are connected to each other. Connection between the outer nozzle 20a and the inner nozzle 20b is preferably performed by using the screw joint 26 shown in FIG. 13. Alternatively, connection between the outer nozzle 20a and the inner nozzle 20b can be performed in a form of generally connecting tubes such as welding or caulking.

When the sealing part 19 is provided, if the inner nozzle 20b is divided from the outer nozzle 20a, the inner nozzle 20b is not present on the centerline S, thereby facilitating construction of the sealing part 19. Further, a forest of nozzles is present on the inner side of the reactor vessel 10, and there is only a little space between adjacent nozzles 20. A wide work space can be ensured by dividing the inner nozzle 20b from the outer nozzle 20a, thereby facilitating operations. Accordingly, mounting of the nozzle 20 can be performed more easily. To facilitate construction of the sealing part 19, it is desired that a divided position between the outer nozzle 20a and the inner nozzle 20b approaches the flange 25 without limit.

When the outer nozzle 20a and the inner nozzle 20b are not divided and the nozzle 20 is integrally constructed as shown in FIG. 12, there is an advantage that any connection work between the outer nozzle 20a and the inner nozzle 20b is not required.

[Sixth Embodiment]

In a nozzle mounting structure according to a sixth embodiment of the present invention, the nozzle 20 is detached from the reactor vessel 10 shown in FIG. 1, and a new nozzle is mounted on the reactor vessel 10.

The nozzle mounting structure includes a removed concave portion in which a base material at an opening of a through-hole is removed together with a weld part, on an inner surface side of a reactor vessel after a nozzle has been detached, though not shown. The removed concave portion is formed based on a symmetrical shape around a centerline of the nozzle (the through-hole at the time of construction). The symmetrical shape around the centerline includes one having a circular outer diameter around the centerline S and one having a regular polygonal outer diameter around the centerline S.

The nozzle mounting structure also includes a flange in the new nozzle. The flange is inserted into the removed concave portion, and is formed in the same symmetrical shape as that of the removed concave portion around the centerline, which becomes flush with a clad provided on the inner surface of the reactor vessel.

The nozzle mounting structure also includes a weld part for welding the nozzle to the reactor vessel. The weld part includes an overlay weld part welded to an outer surface of the existing weld part 16 (see FIG. 1) on an outer surface side of the reactor vessel, based on a normal line on a hemispherical convex outer surface in a lower head of the reactor vessel, and a joint weld part in which the nozzle protruding from the weld part 16 and the overlay weld part are welded together based on the normal line. In the overlay weld part, stainless steel or Ni-base alloy is overlay welded to the outer surface of the weld part 16, and in the joint weld part, stainless steel or Ni-base alloy is joint welded to a slotted portion of the overlay weld part.

According to the nozzle mounting structure of the sixth embodiment, machining of the removed concave portion and positioning of the nozzle in the flange can be performed around a centerline of the nozzle, and welding of the nozzle to the reactor vessel can be performed based on the normal line on the outer surface of the lower head, thereby enabling to facilitate mounting of the nozzle. Particularly, according to the nozzle mounting structure of the sixth embodiment, any welding operation on the inside of the reactor vessel is not required, and the welding operation is performed only on outside of the reactor vessel. Accordingly, mounting of the nozzle can be performed more easily.

[Seventh Embodiment]

In a nozzle mounting structure according to a seventh embodiment of the present invention, the nozzle 20 is detached from the reactor vessel 10 shown in FIG. 1, and a new nozzle is mounted on the reactor vessel 10.

The nozzle mounting structure includes a large-diameter through-hole in which a through-hole is expanded and a base material is removed together with a weld part, on an inner surface side of a reactor vessel after a nozzle has been detached, although not shown in the drawings. The large-diameter through-hole is formed based on a symmetrical shape around a centerline of the nozzle (the through-hole at the time of construction). The symmetrical shape around the centerline includes one having a circular outer diameter around the centerline S and one having a regular polygonal outer diameter around the centerline S.

The nozzle mounting structure also includes a sleeve. The sleeve is a cylindrical body formed in the same symmetrical shape as an inner surface of the large-diameter through-hole around the centerline. The sleeve is inserted into the large-diameter through-hole, follows an inner circumference of the large-diameter through-hole, and becomes flush with a clad provided on the inner surface of the reactor vessel and an outer surface of the reactor vessel.

The nozzle mounting structure includes a flange in the new nozzle. The flange is fitted into the inside of the sleeve inserted into the large-diameter through-hole, and protrudes toward the inner surface and outer surface sides of the reactor vessel. The flange is formed based on the same symmetrical shape as the inner surface of the sleeve around the centerline.

The nozzle mounting structure also includes a weld part for welding the nozzle to the reactor vessel. The weld part includes an overlay weld part welded to an outer surface side of the reactor vessel, in which the weld part 16 (see FIG. 1) is removed, based on a normal line on a hemispherical convex outer surface in a lower head of the reactor vessel, and a joint weld part in which the nozzle protruding from the large-diameter through-hole and the overlay weld part are welded together based on the normal line. In the overlay weld part, stainless steel or Ni-base alloy is overlay welded to the outer surface of the reactor vessel, and in the joint weld part, stainless steel or Ni-base alloy is joint welded to a slotted portion of the overlay weld part.

According to the nozzle mounting structure of the seventh embodiment, machining of the large-diameter through-hole and positioning of the nozzle in the flange can be performed around the centerline of the nozzle, and welding of the nozzle to the reactor vessel can be performed based on the normal line on the outer surface of the lower head, thereby enabling to facilitate mounting of the nozzle. Particularly, according to the nozzle mounting structure of the seventh embodiment, any welding operation on the inside of the reactor vessel is not required, and the welding operation is performed only on the outside of the reactor vessel. Accordingly, mounting of the nozzle can be performed more easily.

[Industrial Applicability]

As described above, the nozzle mounting structure according to the present invention is suitable for easily performing mounting of a nozzle.

[Reference Signs List]

10 reactor vessel
11 lower head
12 base material
13 clad
14 through-hole
17 removed concave portion
18 weld part
18a overlay weld part
18b joint weld part
19 sealing part
20 nozzle
20a outer nozzle
20b inner nozzle
25 flange
26 screw joint
27 fixing part
N normal line
S centerline

The invention claimed is:

1. A nozzle mounting structure for mounting a nozzle penetrating through a reactor vessel having a hemispherical concave inner surface, the nozzle mounting structure comprising:
   a removed concave portion in which a base material on an inner surface side of the reactor vessel is removed in a symmetrical shape around a normal line on a hemispherical concave inner surface of the reactor vessel;
   a flange provided on the nozzle, formed in a same symmetrical shape as that of the removed concave portion around the normal line, and inserted into the removed concave portion; and
   a weld part provided around the normal line for welding the flange to the reactor vessel.

2. The nozzle mounting structure of claim 1, wherein the nozzle is divided into an outer nozzle including the flange and extending to outside of the reactor vessel, and an inner nozzle arranged inside of the reactor vessel, which does not include the flange, and the outer nozzle and the inner nozzle are connected to each other.

3. A nozzle mounting structure for mounting a nozzle penetrating through a reactor vessel having a hemispherical concave inner surface, the nozzle mounting structure comprising:
   a removed concave portion in which a base material on an inner surface side of the reactor vessel is removed based on a symmetrical shape around a centerline of the nozzle;

a flange provided on the nozzle, formed in a symmetrical shape around the centerline, inserted into the removed concave portion, and protruding to outside of the removed concave portion;

an overlay weld part welded to a surface of a clad provided on an inner surface of the reactor vessel and over an outer circumference of the flange protruding to outside of the removed concave portion around the centerline; and a joint weld part for welding the flange to the overlay weld part around the centerline.

* * * * *